(12) United States Patent
Liu et al.

(10) Patent No.: US 9,014,444 B2
(45) Date of Patent: Apr. 21, 2015

(54) METHOD AND APPARATUS FOR AUTOMATIC HER2 SCORING OF TISSUE SAMPLES

(71) Applicant: Sony Corporation, Tokyo (JP)

(72) Inventors: Ming-Chang Liu, San Jose, CA (US); Ximin Zhang, San Jose, CA (US)

(73) Assignee: Sony Corporation, Tokyo (JP)

( * ) Notice: Subject to any disclaimer, the term of this patent is extended or adjusted under 35 U.S.C. 154(b) by 202 days.

(21) Appl. No.: 13/659,408

(22) Filed: Oct. 24, 2012

(65) Prior Publication Data

US 2014/0112568 A1    Apr. 24, 2014

(51) Int. Cl.
*G06K 9/00* (2006.01)
*G06K 9/32* (2006.01)
*G06T 7/00* (2006.01)

(52) U.S. Cl.
CPC ............ *G06K 9/0014* (2013.01); *G06T 7/0012* (2013.01); *G06T 2207/30024* (2013.01)

(58) Field of Classification Search
USPC .................................................. 382/128–134
See application file for complete search history.

(56) References Cited

U.S. PATENT DOCUMENTS

| 5,828,776 A | * | 10/1998 | Lee et al. ....................... 382/133 |
| 7,760,927 B2 | | 7/2010 | Gholap et al. |
| 2001/0041347 A1 | * | 11/2001 | Sammak et al. ............. 435/7.23 |
| 2005/0136549 A1 | * | 6/2005 | Gholap et al. ................ 436/501 |
| 2010/0279341 A1 | | 11/2010 | Steiner et al. |

* cited by examiner

*Primary Examiner* — Alex Liew
(74) *Attorney, Agent, or Firm* — Moser Taboada

(57) ABSTRACT

Certain aspects of an apparatus and method for method and apparatus for automatic HER2 scoring of tissue samples may include for determining a cancer diagnosis score comprising identifying one or more nuclei in a slide image of a tissue sample, determine one or more membrane strengths in the slide image surrounding each of the one or more nuclei, classifying one or more cells, each corresponding to the one or more nuclei, in a class among a plurality of classes according to the one or more membrane strengths and determining a cancer diagnosis score based on a percentage of cells classified in each of the plurality of classes.

20 Claims, 10 Drawing Sheets

METHOD AND APPARATUS FOR AUTOMATIC HER2 SCORING OF TISSUE SAMPLES

CROSS-REFERENCE TO RELATED APPLICATIONS/INCORPORATION BY REFERENCE

This application makes reference to:
Co-pending U.S. patent application Ser. No. 13/659,438 filed on Oct. 24, 2012 and Co-pending U.S. patent application Ser. No. 13/549,019 filed Jul. 13, 2012.

Each of the above referenced applications is hereby incorporated herein by reference in its entirety.

FIELD

Certain embodiments of the disclosure relate to tissue sample scoring. More specifically, certain embodiments of the disclosure relate to a method and apparatus for automatic HER2 scoring of tissue samples.

BACKGROUND

In the area of biology and medicine, understanding cells and their supporting structures in tissues and tracking their structure and distribution changes are very important. Histology is the study of the microscopic anatomy of tissues and is essential in the diagnosing disease, developing medicine and many other fields. In histology, thin slice of tissue samples are examined under a light microscope or electron microscope. In order to visualize and differentiate the microscopic structure of the tissue sample, a common approach is to stain the tissue sample with a combination of several dyes that have selective responses to different biological substances. In doing so, specified biological substances such as nuclei, cytoplasm, membranes, other structures, and specific proteins can be visually enhanced.

Breast cancer is one of the major diseases that threaten the well-being of human beings. Human epidermal growth factor receptor 2 (HER2) is a protein found on the surface of cells that, when functioning normally, has been found to be a key component in regulating cell growth. However, when the HER2 protein is altered, extra HER2 protein receptors may be produced. This over-expression of HER2 causes increased cell growth and reproduction, often resulting in more aggressive breast cancer cells. Based on this finding, multi-stain based HER2 testing has been developed for invasive breast cancer. The HER2 testing results are represented by an HER2 "score". Currently, the process of generating an HER2 "score" is purely based on the visual analysis of an examining pathologist. The process is time consuming and results are often inconsistent.

Therefore there is a need in the art for an efficient method and apparatus for automatic HER2 scoring of tissue samples.

Further limitations and disadvantages of conventional and traditional approaches will become apparent to one of skill in the art, through comparison of such systems with some aspects of the present disclosure as set forth in the remainder of the present application with reference to the drawings.

SUMMARY

An apparatus and/or method is provided for automatic HER2 scoring of tissue samples substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Certain implementations may be found in an apparatus and/or method for automatic HER2 scoring of tissue samples. According to one embodiment, a salient region is selected from an input slide containing tissue samples where the salient region is based on either user input, or algorithmic selection, to find the region which is rich in both the red and blue channel. Stain vectors of the region are calculated. Optical Domain transformations are applied to a user-selected interest area in the input slide, and then stain separation is performed on the transformed area into a gray nuclei image and a gray membrane image. The nuclei in the gray nuclei image are identified and center locations are determined. Membrane patterns around the nuclei are analyzed to classify the cells along with the nuclei. Non-important areas are removed and not classified. A final score is computed based on the classifications of the cells and the nuclei and removal of the non-important areas.

Figure 1:
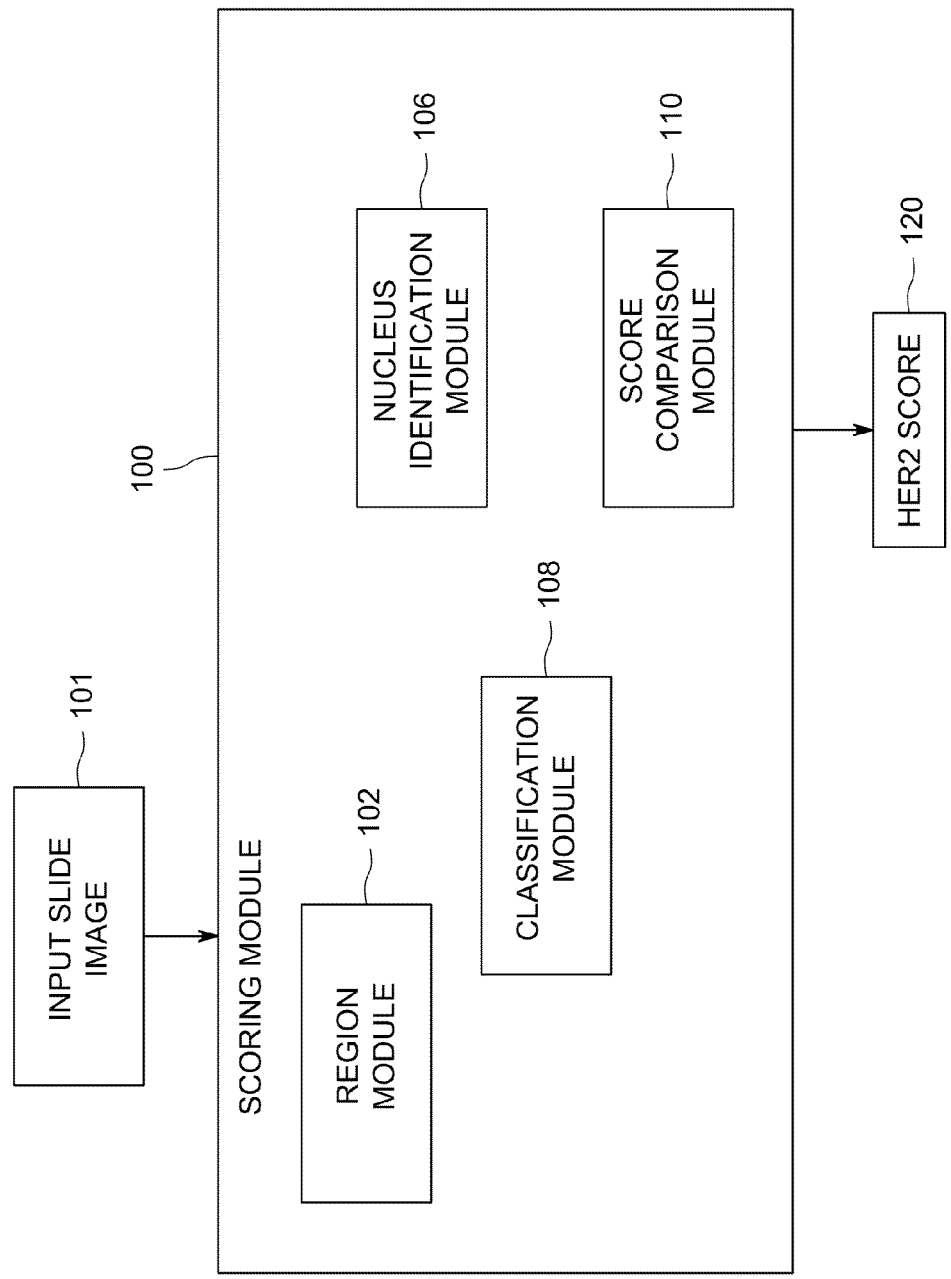
FIG. 1 is a block diagram illustrating an HER2 scoring module, in accordance with an embodiment of the disclosure.

FIG. 1 is a block diagram illustrating an HER2 scoring module 100, in accordance with an embodiment of the disclosure. The HER2 scoring module 100 comprises a region module 102, a nucleus identification module 106, a classification module 108 and a scene comparison module 110. The scoring module 100 takes an input slide image 101 as an input. According to one embodiment, the scoring module 100 is directly coupled to an electron microscope, or other device through which slides of tissue samples are viewed.

Figure 2:
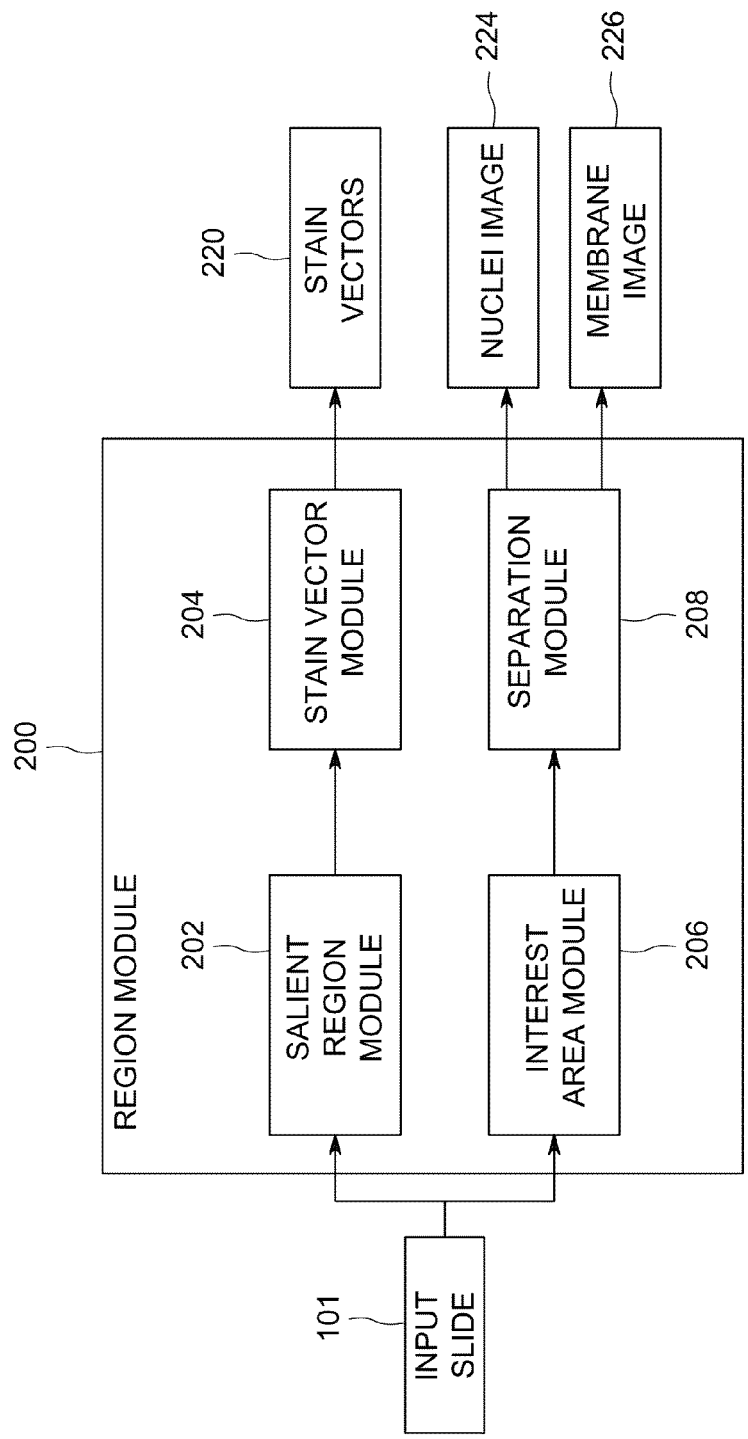
FIG. 2 is a functional block diagram of a region module in accordance with exemplary embodiments of the present disclosure.

FIG. 2 is a functional block diagram of a region module 200 in accordance with exemplary embodiments of the present disclosure. The region module 200 comprises a salient region module 202, a stain vector module 204, an interest area module 206 and a separation module 208. The HER2 scoring module 100 from FIG. 1 passes the input slide image 101 to the salient region module 202 and the interest area module 206, in parallel.

The salient region module 202 is coupled to the stain vector module 204. The salient region module 202 analyzes the input slide image 101 and determines that a particular region of the image 101 is the salient region for analysis. Saliency measure is determined by, according to one embodiment, an automated color analysis that finds the region of the image 101 that is rich with stain in both red and blue channels. In some embodiments, if the input slide image 101 is determined to be smaller than a threshold size, the entire image is determined to be the salient region. The stain vector module 204 takes the salient region as input and calculates stain vectors 220 of the region, as disclosed in related and commonly assigned pending U.S. patent application Ser. No. 13/549,019, which is hereby incorporated by reference.

In parallel, the interest area module 206 extracts a user interest area from the input slide image 101. The image 101 is transformed from a red green blue (RGB) domain to an optical domain through the optical transform according to the following equation: $OD = -\log_{10}(I/I_0)$, where I is the observed intensity and $I_0$ is the incident light intensity (which is usually 255 for 8 bit image), as described in the commonly assigned and co-pending U.S. patent application Ser. No. 13/549,019, herein incorporated by reference in its entirety.

The separation module 208 takes the optical domain image as input and separates the optical domain image into a nuclei image 224 and a membrane image 226.

Figure 3:
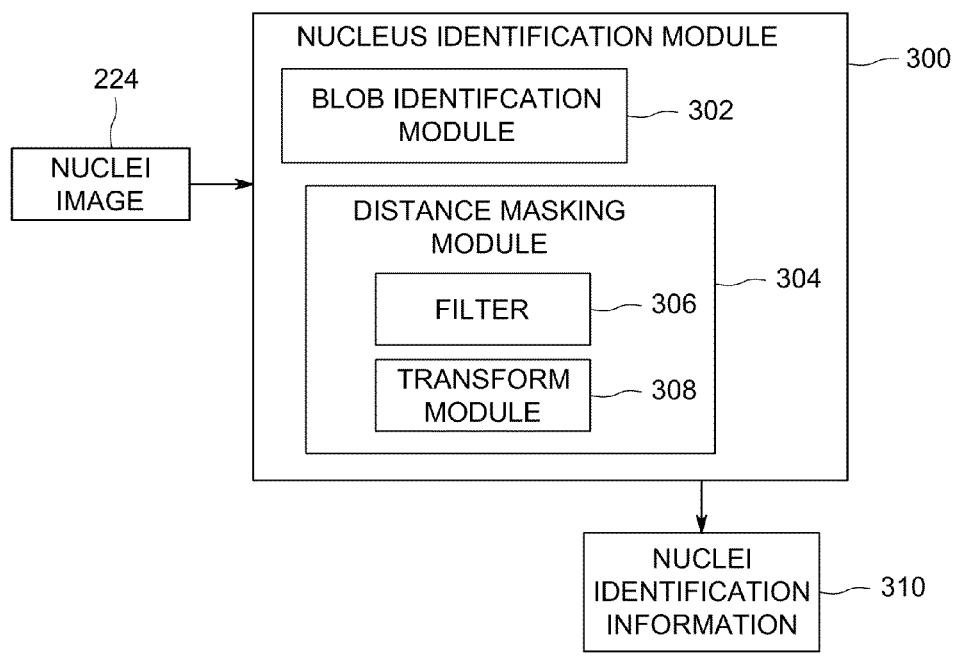
FIG. 3 is a functional block diagram of a nucleus identification module in accordance with exemplary embodiments of the present invention.

FIG. 3 is a functional block diagram of a nucleus identification module (NIM) 300 in accordance with exemplary embodiments of the present invention. The NIM 300 comprises a blob identification module 302 and a distance masking module 304. The distance masking module 304 further comprises a filter 306 and a transform module 308. The nucleus identification module 300 receives the nuclei image 224 from region module 200 as input, and outputs nuclei identification information 301. The nuclei identification information 301 contains data on the size and location of the various nuclei present in the nuclei image 224.

According to an exemplary embodiment, the blob identification module 302 applies a window averaging procedure to each pixel of the nuclei image according to the following expression:

$$\overline{P(i,j)} = \frac{1}{N \times N} \sum_{t=1}^{N} \sum_{f=1}^{N} P\left(i - \frac{N}{2}, j - \frac{N}{2}\right)$$

where N is the length of the window. Typically, N is equal to the diameter of a typical tumor cell nucleus. After all pixels of the nuclei image 224 are processed, an image inverse process is performed:

$$\overline{P(i,j)} = 255 - \overline{P(i,j)}$$

After the inversion, each pixel of image 224 is compared to a threshold value to determine if the current pixel is a potential nucleus center. If the pixel value is greater than the threshold, the current pixel is identified as a potential nucleus center; otherwise, the pixel is excluded as a potential nucleus center.

A low-pass filter 306 is applied to the nuclei image 224 in the distance masking module 304. The filter 306 removes noise from the nuclei image 224, and subsequently a binary image generation process is applied to each pixel of the low-pass filtered image according to the following formula:

$$B(i,j) = \begin{cases} 1 & \text{if } P(i,j) < T1 \\ 0 & \text{if } P(i,j) \geq T1 \end{cases}$$

T1 is a threshold that determines if current pixel has strong enough nuclei stain to be qualified as a potential nuclei pixel. The less the value of the pixel, the stronger the stain is.

The distance masking module 304 then takes the potential nucleus centers as a second input from the blob identification module 302. The transform module 308 applies a distance transform to the binary image to find the minimum distance of each white pixel (value of 1) to any black pixel (value of 0). Once the distance transform is complete, a distance image is generated with the distance value as the pixel value. For each potential nucleus center pixel identified in blob identification module 302, the corresponding distance value in the same location is added onto the potential nucleus center pixel to generate a new image according to the following equation:

$$P_{new}(i,j) = \begin{cases} \overline{P(i,j)} + D(i,j) & \text{if } \overline{P(i,j)} \text{ is a potential nucleus center} \\ 0 & \text{Otherwise} \end{cases}$$

Each pixel in the new generated image is compared to its neighbors. The local maximum pixel is identified as a nucleus center. The N×N area surrounding it is identified as the nucleus area and output as nucleus identification information 310. According to one embodiment, the nucleus center is identified as the local maximum pixel in the new image.

Figure 4A:
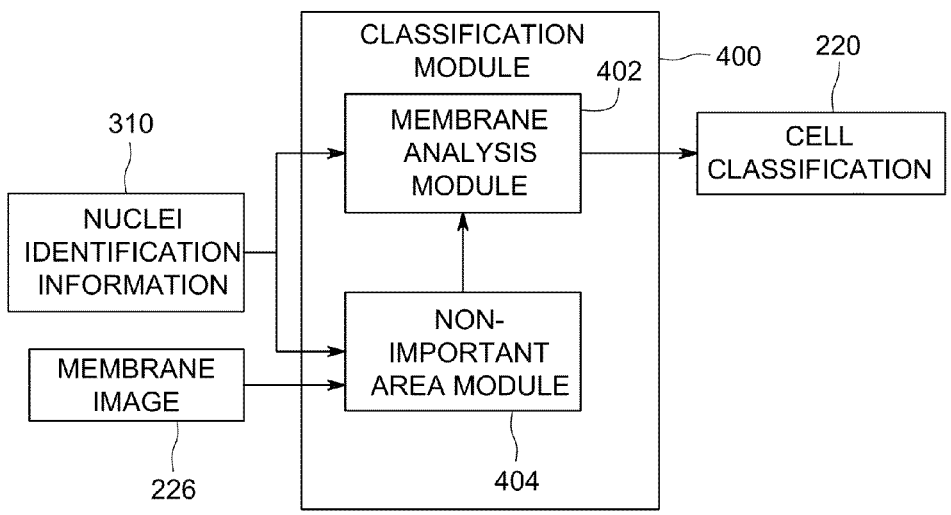
FIG. 4A is a functional block diagram of a classification module in accordance with exemplary embodiments of the present disclosure.

FIG. 4A is a functional block diagram of a classification module 400 in accordance with exemplary embodiments of the present disclosure. FIG. 4A shows a detailed view of the classification module 108 of FIG. 1 as classification module 400. The classification module 400 comprises a membrane analysis module 402 and a non-important area module 404. The membrane analysis module 402 is coupled with the non-important area module 404. The membrane analysis module 402 takes nuclei identification information 310 from FIG. 3 as input and outputs a cell classification 220 of the current cell, or multiple cells being analyzed.

Initially, both the membrane analysis module 402 and the non-important area module 404 receive the nuclei identification information 401 as input. The non-important area module 404 also receives the membrane image as an input in parallel. The non-important area module 404 supplies data to the membrane analysis module 402.

The non-important area module 404 takes the membrane image 226 from FIG. 2 as well as the nuclei identification information 310 from FIG. 3 as inputs. In multi-stained tissue sample, some nuclei-like areas are composed of structures that are not related to cancer tumor tissue.

For each identified nucleus, the non-important area module 404 examiners its four large neighbor areas to determine if there are many nuclei close to the current identified nucleus. According to some embodiments, each area is a square with 16 times the size of the nuclei. If the number of nuclei in the neighboring areas is less than a predetermined threshold, the current nucleus will be excluded from the final scoring process. In one embodiment, the average intensity of the nuclei image in the four neighbors can also be used to estimate the lack of nuclei in the neighboring four areas. If there are not more than 3 neighbors have average intensity less than a predetermined threshold, the current nucleus will be excluded from the final scoring process.

The four large neighboring areas are also examiner to see if there is enough membrane staining close to the current nucleus. In one embodiment, the average intensity of the membrane image in the four neighboring regions is used to estimate the staining, if there is not enough membrane tissue in the four neighboring areas. If all of the current nucleus' four large neighbors have average intensities great than a threshold, the current nucleus will be excluded from the final scoring process.

The membrane analysis module 402 analyzes the membrane of each cell and classifies the cell based on the result, ignoring those regions deemed as non-important areas by the non-important area module 404. Using the nucleus identification information 310 from FIG. 3, a multi-directional search is applied to find the strongest membrane stain, or the first local maximum of the membrane stain position in each direction. The search is contained within an M×M window with the nucleus center as the window center. M is predetermined to be a scan resolution related parameter. Generally, M is twice the length of the diameter of a typical tumor cell.

After all positions of either the strongest membrane stain or first local maximum are found, the stain strength values of the positions are analyzed. Cell classifications are then produced based on the scoring guideline provided by the American Society of Clinical Oncology and the College of American Pathologists. According to the scoring guidelines, the membrane stain value of each point along each of eight direction is compared to two thresholds to determine if the strength is intense, moderate or weak.

If the membrane strength of at least seven positions of the strongest membrane stains, or the first local maximums, is intense, the cell identified in the tissue sample in input slide image 101 is classified as class 3. Otherwise, if the membrane strength of eight points is moderate or intense, the cell is classified as class 2. Otherwise, if the membrane strength of at least five points is intense moderate or intense the class is classified as class 1. In all other cases, the cell is classified as class 0.

Figure 4B:
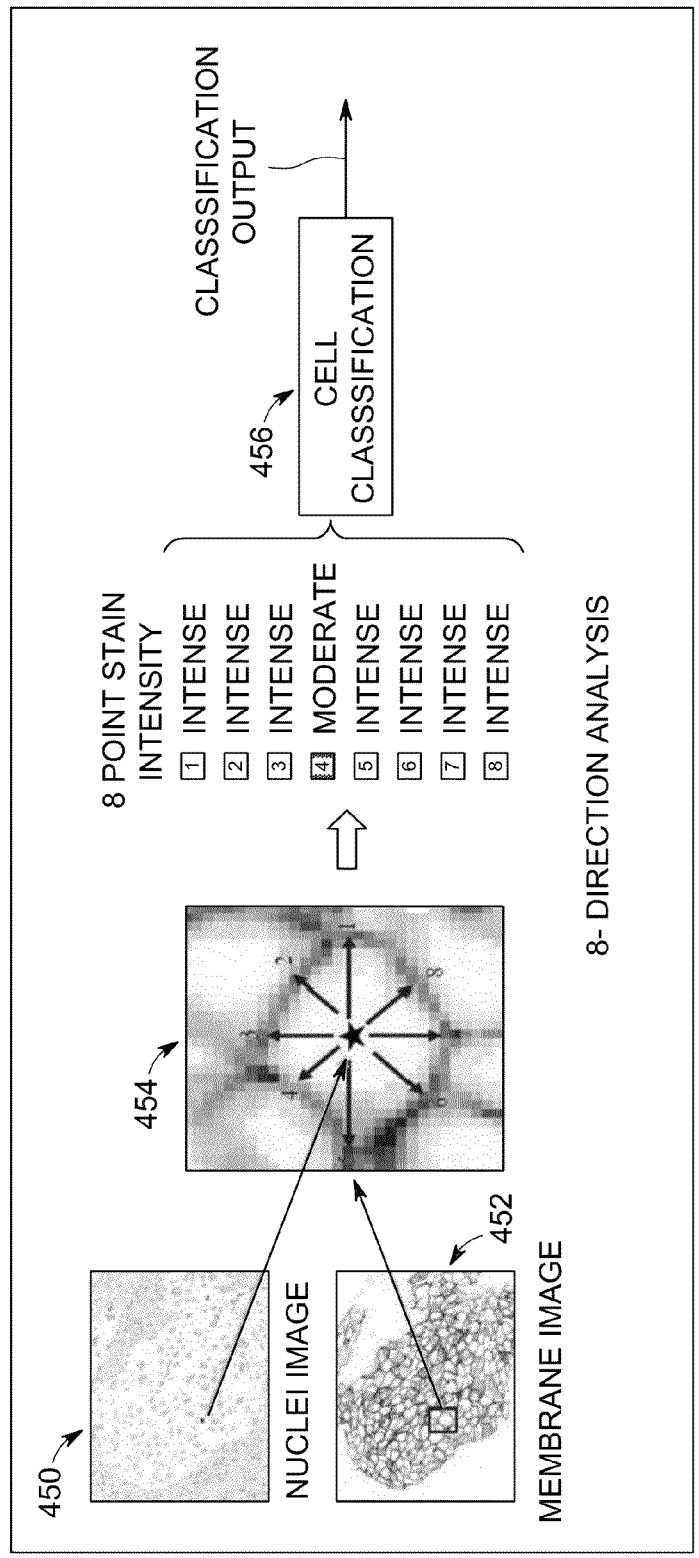
FIG. 4B illustrates an example nuclei image and an example membrane image.

FIG. 4B illustrates an example nuclei image 450 and an example membrane image 452. The 8 direction analysis is shown in image 454 where membrane strength or average intensity is determined in each direction. This results in a classification of the cell 456.

Under certain conditions, the nuclei of some strong membrane stained cells cannot be observed due to the slide preparation process. However, these unobserved nuclei must still be considered in the scoring analysis. Cell center identification is performed on a cell. Then, the multi-direction ray analysis is performed as described above by the membrane analysis module 402.

According to one embodiment, identifying the cell center is performed by calculating average membrane stain strength for a square window W surrounding a point for each pixel position that is not a nucleus. The size of the window is usually selected as M/2×M/2, where M, as described above, is twice the length of the diameter of a typical tumor cell. Then, the average membrane stain strength is calculated for a smaller square window W(C) within the window W. If the average membrane stain strength of window W(C) is less than the average membrane stain strength of window W, the current pixel is identified as the cell center. Subsequently, multi-direction ray analysis is applied from the pixel according to the scoring guideline. If the current cell is detected as class 2 or class 3, the cell is counted for final scoring.

Finally, an HER2 score is calculated based on the previous analysis. The final HER2 score is based on the percentage of the number of cells in each class compared to the total number of detected tumor cells. In one embodiment, it can be calculated as following: If more than 30% of detected tumor cells are class 3 cells, the score is 3+. Otherwise, if more than 10% of detected tumor cells are class 3 cells or class 2 cells, the score is 2+. Otherwise, if more than 10% of detected tumor cells are class 3 cells or class 2 cells or class 1 cells, the score is 1+. Otherwise, if less than 10% of detected tumor cells are class 3 cells or class 2 cells or class 1 cells, the score is 0+.

Figure 5:
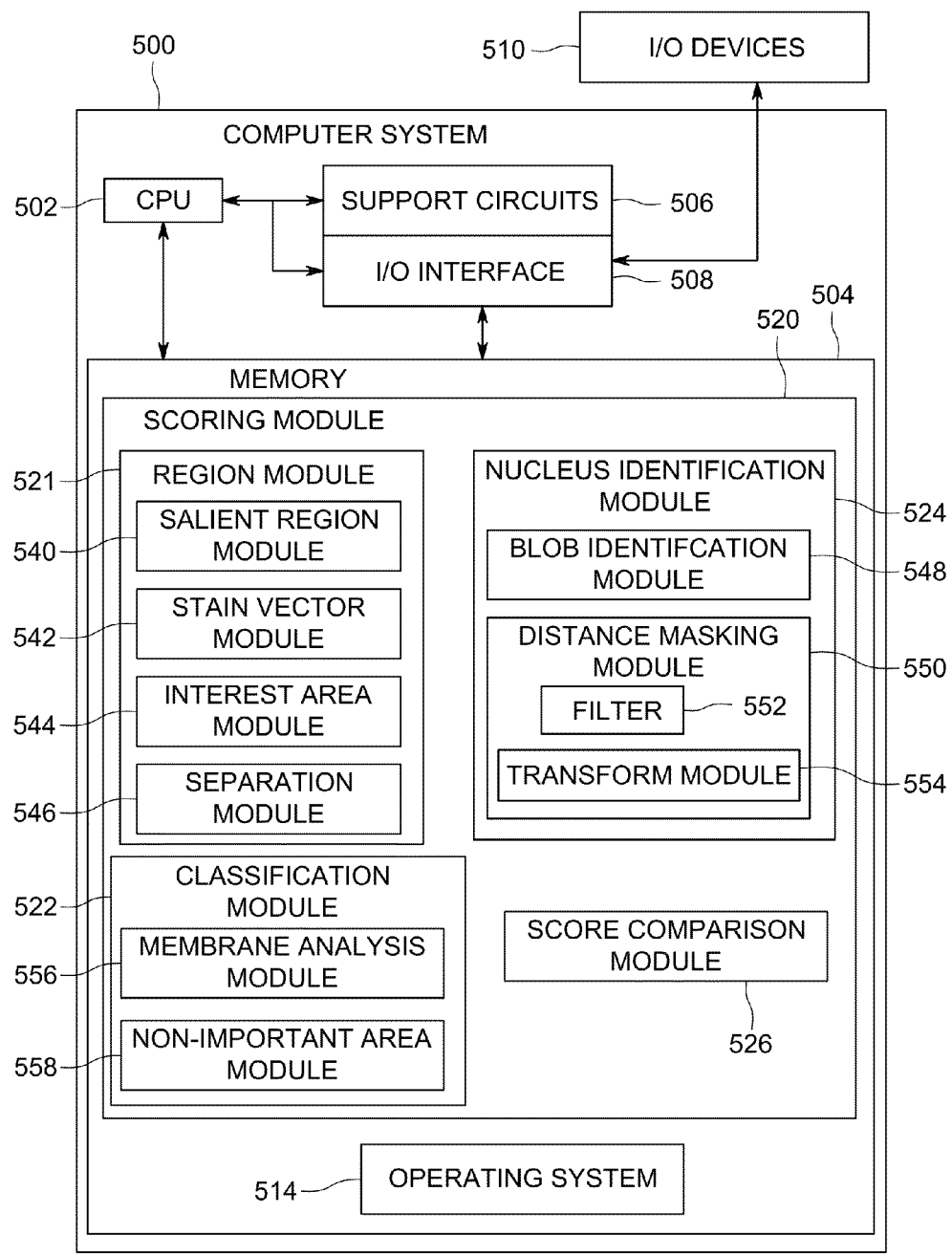
FIG. 5 is a block diagram of a computer system for implementing the scoring module in accordance with embodiments of the present disclosure.

FIG. 5 is a block diagram of a computer system 500 for implementing the scoring module 100 in accordance with embodiments of the present invention. The computer system 500 includes a processor 502, a memory 504 and various support circuits 506. The processor 502 may include one or more microprocessors known in the art, and/or dedicated function processors such as field programmable gate arrays programmed to perform dedicated processing functions. The support circuits 506 for the processor 502 include microcontrollers, application specific integrated circuits (ASIC), cache, power supplies, clock circuits, data registers, input/output (I/O) interface 508, and the like. The I/O interface 508 may be directly coupled to the memory 504 or coupled through the supporting circuits 506. The I/O interface 508 may also be configured for communication with input devices and/or output devices 510, such as, network devices, various storage devices, mouse, keyboard, displays, sensors and the like.

The memory 504 stores non-transient processor-executable instructions and/or data that may be executed by and/or used by the processor 502. These processor-executable instructions may comprise firmware, software, and the like, or some combination thereof. Modules having processor-executable instructions that are stored in the memory 504 comprise the scoring module 520, further comprising the region module 521, the classification module 522, the nucleus identification module 524, and the score comparison module 526.

The computer 500 may be programmed with one or more operating systems (generally referred to as operating system (OS) 514, which may include OS/2, Java Virtual Machine, Linux, Solaris, Unix, HPUX, AIX, Windows, Windows95, Windows98, Windows NT, and Windows 2000, Windows ME, Windows XP, Windows Server, among other known platforms. At least a portion of the operating system 514 may be disposed in the memory 504. In an exemplary embodiment, the memory 504 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

The region module 521 further comprises salient region module 540, stain vector module 542, interest area module 544 and separation module 546. The nucleus identification module 524 further comprises a blob identification module 548 and a distance masking module 550. The distance masking module 550 further comprises a filter 551 and a transform module 554. The classification module 522 further comprises the membrane analysis module 556 and the non-important area module 558.

Figure 6:
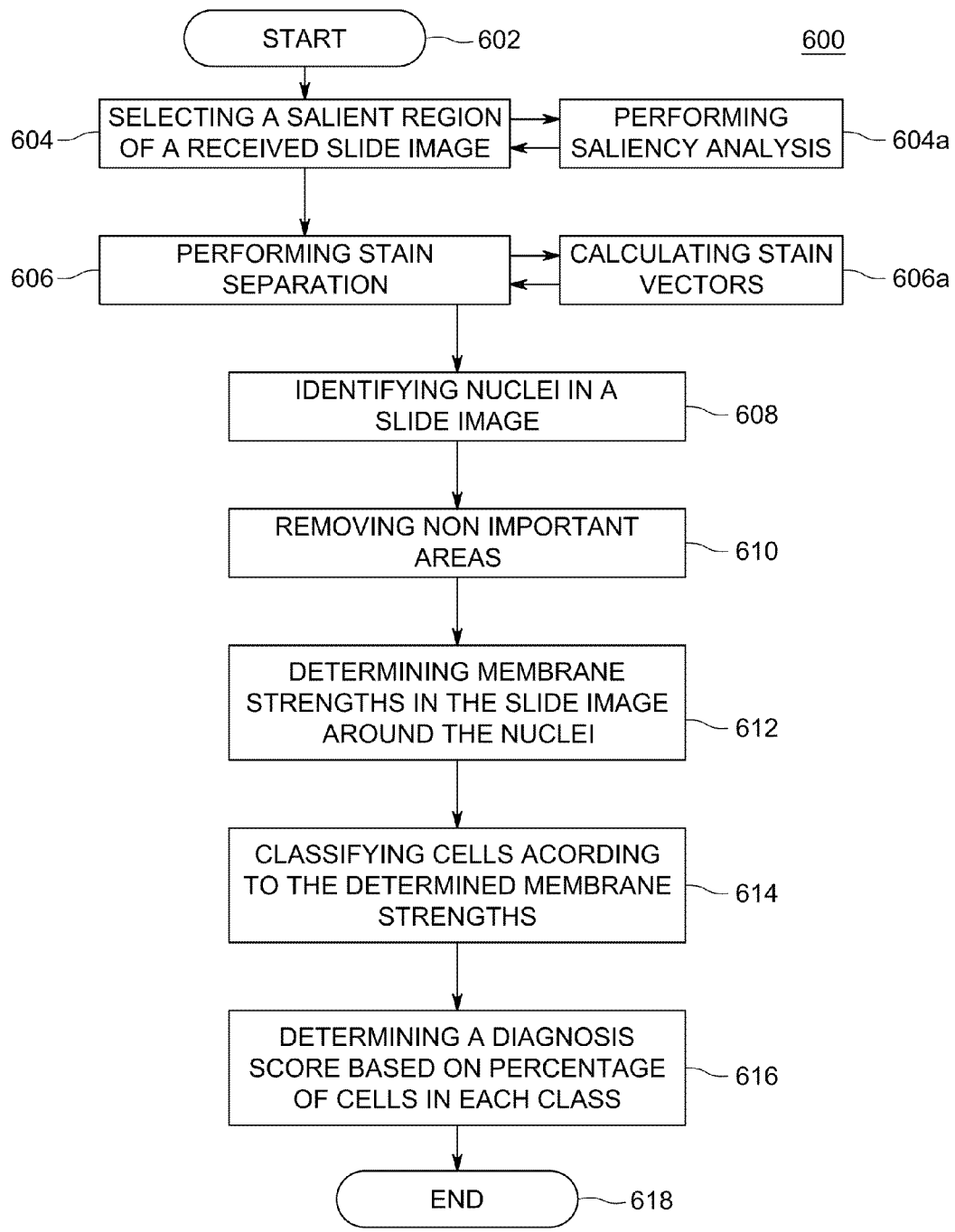
FIG. 6 is an illustration of a flow diagram for a method for determining a diagnosis score according to exemplary embodiments of the present disclosure.

FIG. 6 is an illustration of a flow diagram for a method 600 for determining a diagnosis score according to exemplary embodiments of the present invention. The method 600 is an implementation of the scoring module 100 shown in FIG. 1, implemented as the scoring module 520 in FIG. 5 as executed by the processor 502. The method begins at step 602 and proceeds to step 604.

At step 604, the salient region module 540 identifies the salient regions of an input image (e.g., an input slide image of a tissue sample). Within step 604, the method 600 performs step 604a, wherein saliency analysis is applied to the slide image, which determines the saliency of a region based on the existence of red and blue channels in a stain.

The method then proceeds to step 606, where stain separation is performed on the salient region by the separation module 546. Stain separation is performed in step 606a, where stain vectors are calculated for the stains. At step 608, nuclei are identified in the slide image by the nucleus identification module 524. Once nuclei are identified in the image, non-important areas of the image are removed at step 610, such as areas which do not contain stain or nuclei, or which do not contain beyond a threshold number of nuclei.

At step 612, membrane strengths around the identified nuclei are determined by the membrane analysis module 556 of the classification module 522. The membrane analysis module 556 applies various algorithms in determining the strength of membranes in various areas around identified nuclei.

The method 600 then proceeds to step 614, where the classification module 522 classifies cells whose nucleus has been identified based on the strength of the membranes in the cell. Once the cells are classified into a plurality of classes, a diagnosis score is determined based on the percentage of cells in each class at step 616. The method ends at step 618.

FIG. 6 is an illustration of a flow diagram for a method 600 for determining a diagnosis score according to exemplary embodiments of the present invention. The method 600 is an implementation of the scoring module 100 shown in FIG. 1, implemented as the scoring module 520 in FIG. 5 as executed by the processor 502. The method begins at step 602 and proceeds to step 604.

Figure 7:
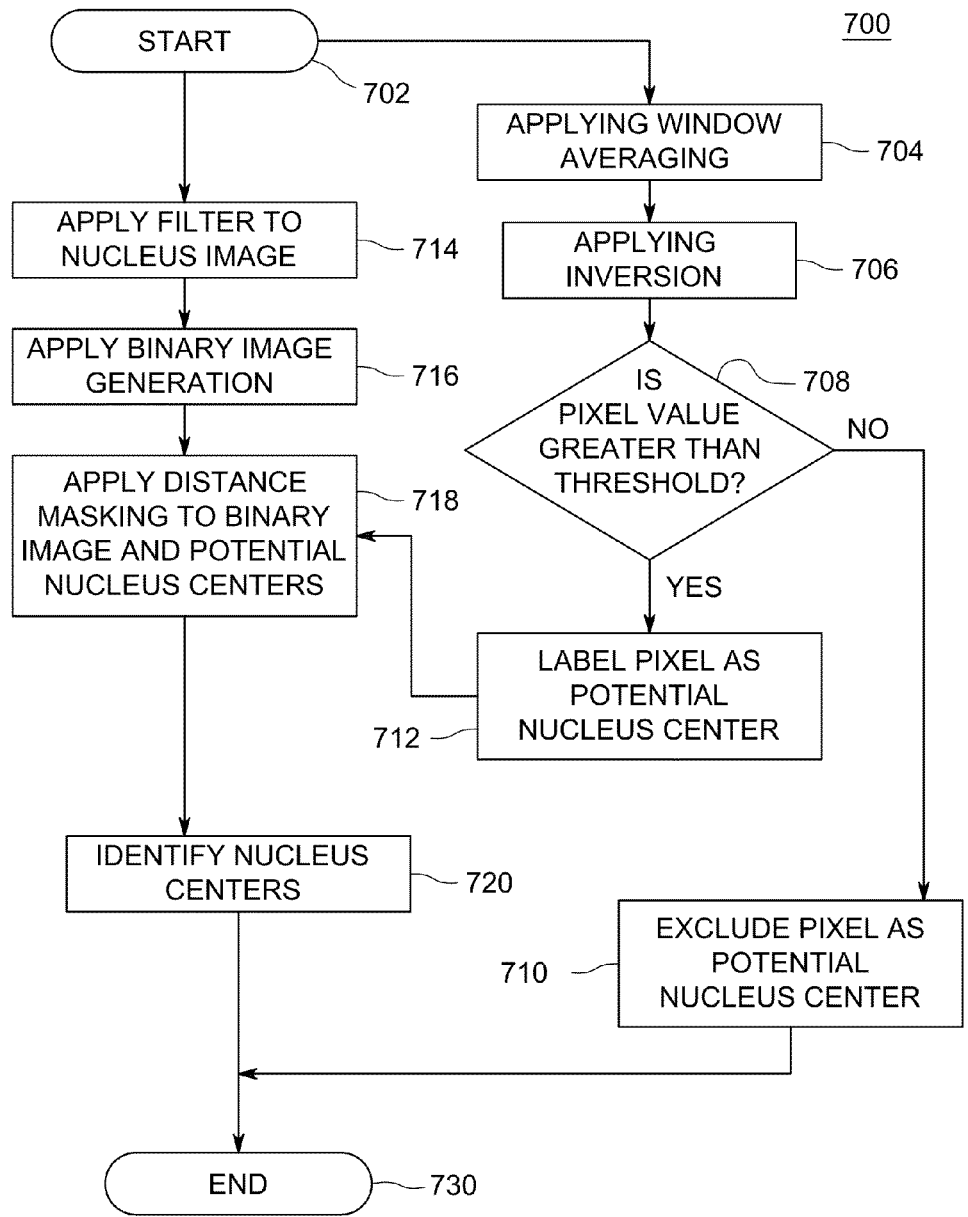
FIG. 7 is an illustration of a flow diagram for a method for identifying a nucleus of a cell in a tissue slide image according to exemplary embodiments of the present disclosure.

FIG. 7 is an illustration of a flow diagram for a method 700 for identifying a nucleus of a cell in a tissue slide image according to exemplary embodiments of the present invention. The method 700 is an implementation of the nucleus identification module 100 shown in FIG. 1, implemented as the module 524 in FIG. 5 as executed by the processor 502. The method begins at step 702 and proceeds to step 704.

Steps 704-712 are executed significantly in parallel to steps 714-716 according to one embodiment of the present invention. First, steps 704-712 will be discussed. At step 704, a window averaging procedure is applied to the nuclei image produced by the earlier stain separation, by the blob identification module. The pixel values obtained through the window averaging are then inverted at step 706 and compared to a predetermined threshold pixel value at step 708. If the value at the current pixel is not greater than the threshold value, the current pixel is excluded as a potential nucleus center at step 720. The method then ends at step 730.

However, if the pixel value is greater than the threshold value at step 708, the method proceeds to step 712, where the pixel is labeled as a potential nucleus center.

In parallel, the nuclei image is filtered by filter 552 of the distance masking module 550. The filter removes low level noise from the nuclei image. At step 716, the transform module 554 applies a binary image generation process to the nuclei image to produce a binary image.

At step 718, the distance masking module 554 takes as input the potential nucleus centers and the binary image and applies distance masking to these inputs. The transform module 554 applies a distance transform to the binary image to find the minimum distance of each white pixel (value of 1) to any black pixel (value of 0). Once the distance transform is complete, a distance image is generated with the distance value as the pixel value. For each potential nucleus center pixel identified in blob identification module 548, the corresponding distance value in the same location is added onto the potential nucleus center pixel to generate a new image according to the following equation:

$$P_{new}(i, j) = \begin{cases} \overline{P(i, j)} + D(i, j) & \text{if } \overline{P(i, j)} \text{ is a potential nucleus center} \\ 0 & \text{Otherwise} \end{cases}$$

Each pixel in the new generated image is compared to its neighbors. The local maximum pixel is identified as a nucleus center. The N×N area surrounding it is identified as the nucleus area and output as nucleus identification information, and nucleus centers are identified in step 720. The method ends at step 730.

Figure 8:
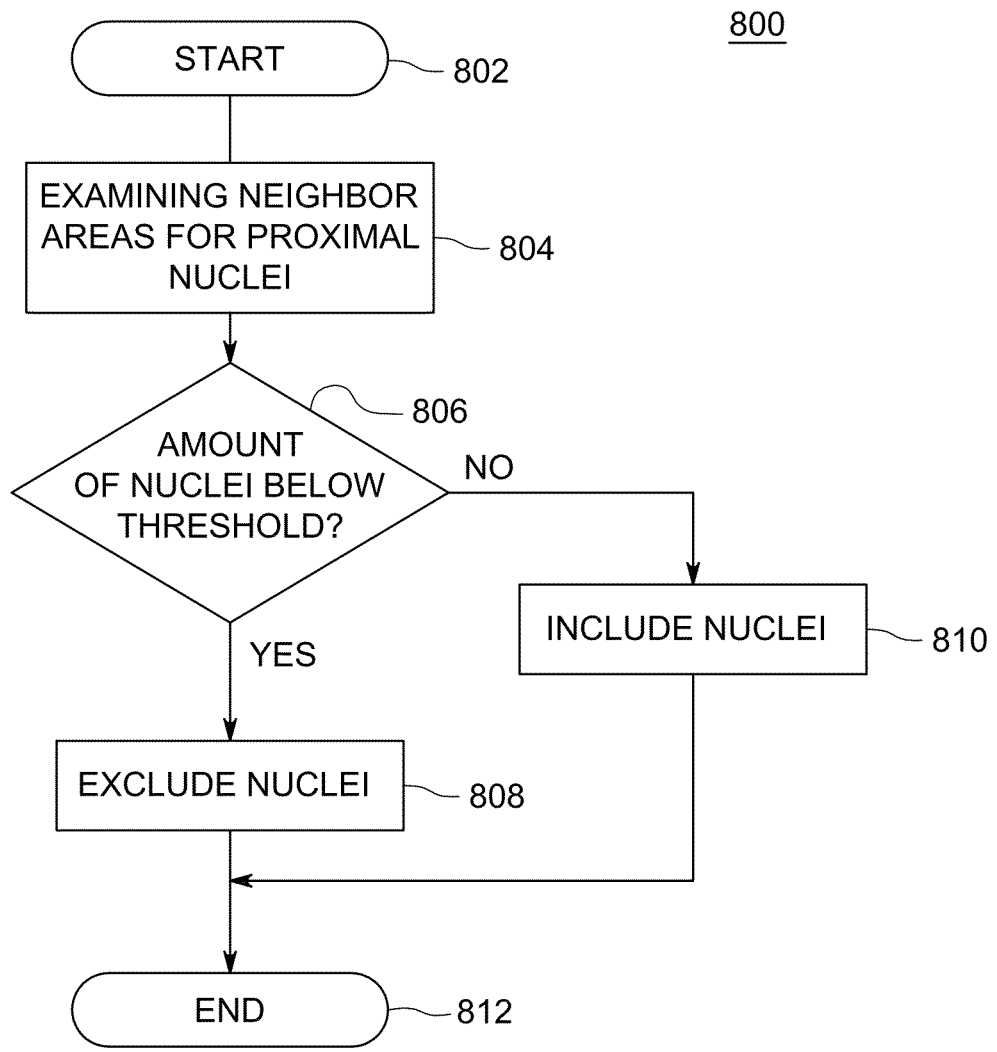
FIG. 8 is an illustration of a flow diagram for a method for non-important area removal of tissue in a slide image according to exemplary embodiments of the present disclosure.

FIG. 8 is an illustration of a flow diagram for a method 800 for non-important area removal of tissue in a slide image according to exemplary embodiments of the present invention. The method 800 is an implementation of the non-important area module 404 shown in FIG. 4, implemented as the module 558 in FIG. 5 as executed by the processor 502. The method begins at step 802 and proceeds to step 804.

At step 804, for each nucleus identified in the method 700, the nuclei image is separated into four neighboring areas around the nucleus. The neighboring areas are examined for nuclei in each area and the amount present.

At step 806, it is determined whether the amount of nuclei in a neighboring area is equal to or above a threshold value. If the amount of nuclei is not below a threshold value, the nuclei remains important, and is not deemed a non-important area and is included in the final scoring metric at step 810. If the amount of nuclei in the neighboring areas is below the threshold value, the nuclei are excluded from the final scoring at step 812. The method ends at step 812.

Figure 9:
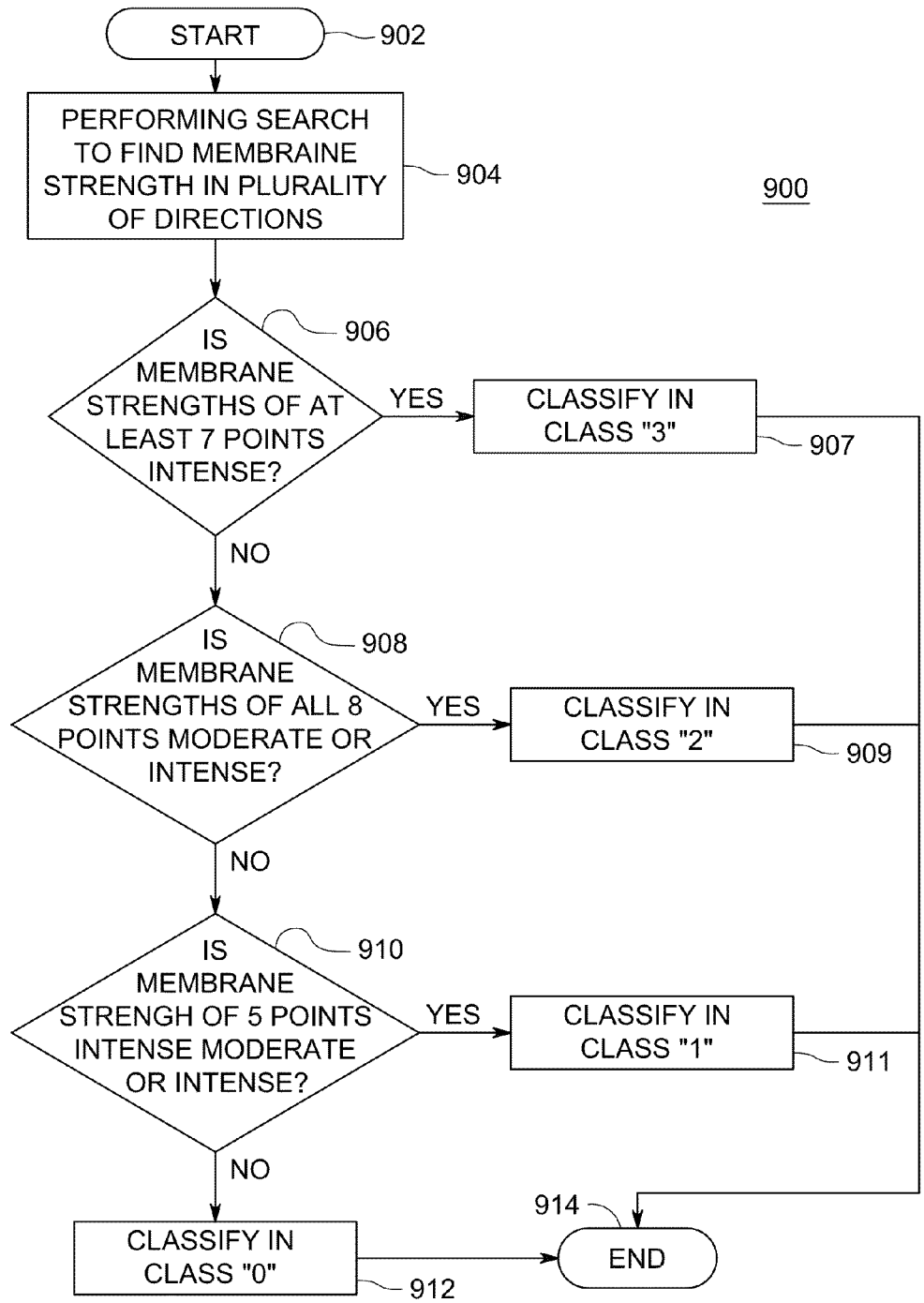
FIG. 9 is an illustration of a flow diagram for a method for classification of cells of tissue in a slide image according to exemplary embodiments of the present disclosure.

FIG. 9 is an illustration of a flow diagram for a method 900 for classification of cells of tissue in a slide image according to exemplary embodiments of the present invention. The method 900 is an implementation of classification module 108 shown in FIG. 1, implemented as the module 522 in FIG. 5 as executed by the processor 502. The method begins at step 902 and proceeds to step 904.

At step 904, the membrane analysis module 556 performs a search in several directions radiating outwards from an identified nucleus among a plurality of nuclei. At several points along each direction, the strength of the membrane at a particular point is classified as moderate, intense or weak.

At step 906, it is determined whether the membrane strength of seven points is intense. If the membrane strength of at least seven points is classified as intense, the cell is classified as a class 3 cell at step 907. If not, the method 900 proceeds to step 908.

At step 908, it is determined whether the membrane strength of all eight recorded points is moderate or intense. If the membrane strength of all eight points is classified as moderate or intense, the cell is classified as a class 2 cell at step 909. If not, the method 900 proceeds to step 910.

At step 910, it is determined whether the membrane strength of at least five recorded points is intense moderate or intense. If the membrane strength of at least five points is classified as intense moderate or intense, the cell is classified as a class 1 cell at step 911. If not, the method 900 proceeds to step 912.

At step 912, the cell is classified as class 0, and the method ends at step 914.

Figure 10:
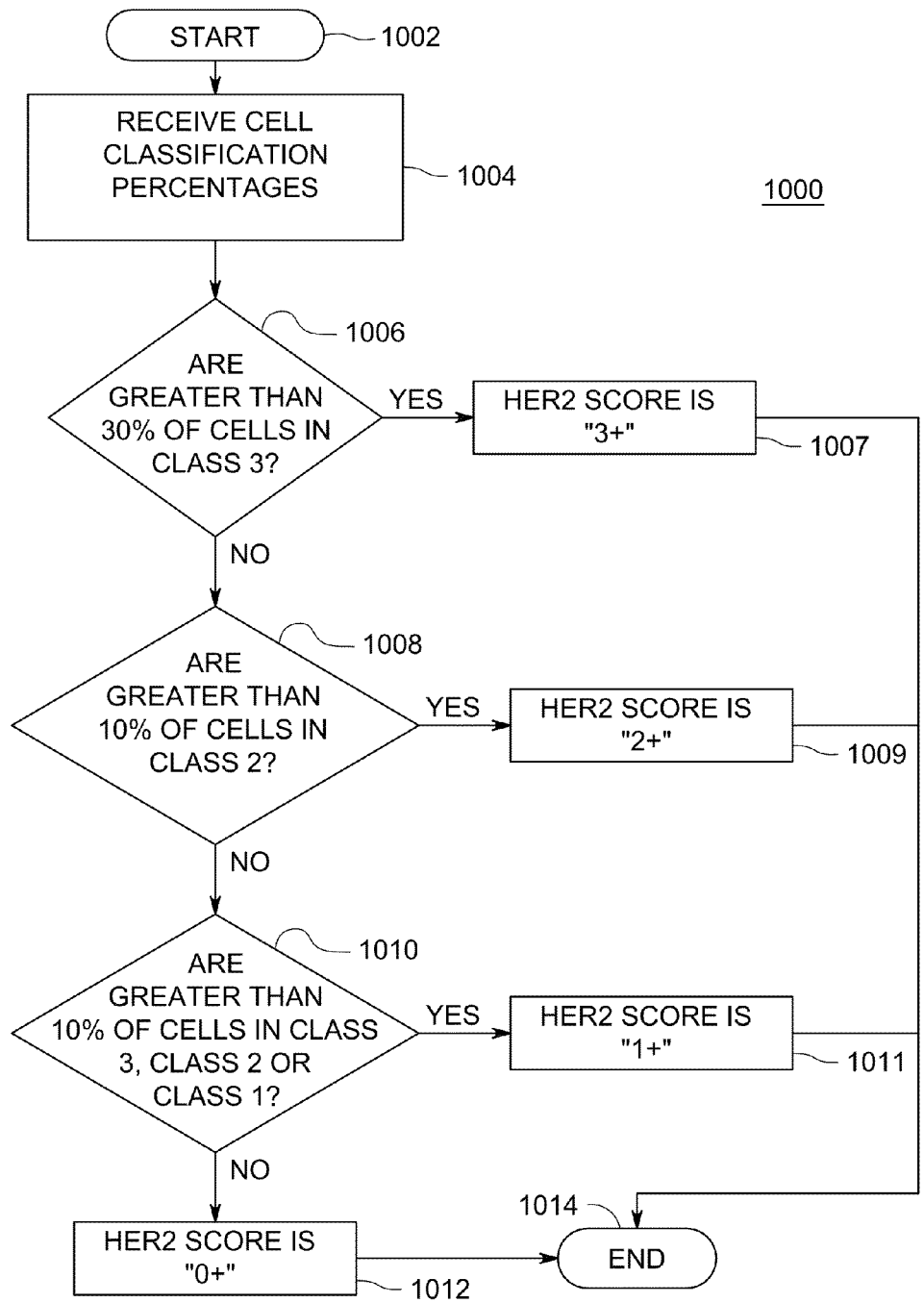
FIG. 10 is an illustration of a flow diagram for a method for classification of cells of tissue in a slide image according to exemplary embodiments of the present invention.

FIG. 10 is an illustration of a flow diagram for a method 1000 for classification of cells of tissue in a slide image according to exemplary embodiments of the present invention. The method 1000 is an implementation of score comparison module 110 shown in FIG. 1, implemented as the module 526 in FIG. 5 as executed by the processor 502. The method begins at step 1002 and proceeds to step 1004.

At step 1004, the score comparison module 526 receives the cell classifications from method 900 and calculates percentages of cells falling into each class.

At step 1006, method 1000 determines whether greater than 30% of cells are in class 3. If greater than 30% of cells are in class 3, the HER2 score is determined to be 3+ at step 1007. If not, the method 1000 proceeds to step 1008.

At step 1008, method 1000 determines whether greater than 10% of cells are in class 3 or class 2. If greater than 10% of cells are in class 3 or class 2, the HER2 score is determined to be 2+ at step 1009. If not, the method 1000 proceeds to step 1010.

At step 1010, method 1000 determines whether greater than 10% of cells are in class 3, class 2 or class 1. If greater than 10% of cells are in class 3, class 2 or class 1, the HER2 score is determined to be 1+ at step 1011. If not, the method 1000 proceeds to step 1012 where the HER2 score is determined to be 0+. The method ends at step 1014.

Accordingly, the present disclosure may be realized in hardware, or a combination of hardware and software. The present disclosure may be realized in a centralized fashion in at least one computer system or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A computer-implemented method for determining a cancer diagnosis score comprising:
   identifying one or more nuclei in a slide image of a tissue sample by performing window averaging on the slide image and inversion of pixel values of the window average;
   determine one or more membrane strengths in the slide image surrounding each of the one or more nuclei;
   classifying one or more cells, each corresponding to the one or more nuclei, in a class among a plurality of classes according to the one or more membrane strengths; and
   determining a cancer diagnosis score based on a percentage of cells classified in each of the plurality of classes.

2. The method of claim 1, further comprising:
   selecting a salient region of the slide image; and
   performing stain separation in the salient region to obtain a nuclei image and a membrane image,
   wherein the identifying one or more nuclei is performed on the nuclei image and the determining one or more membrane strengths is performed on the membrane image.

3. The method of claim 2, further comprising:
   removing non-important areas from the nuclei image and the membrane image before determining one or more membrane strengths.

4. The method of claim 2, wherein selecting a salient region further comprises:
   performing a saliency analysis on slide image to find a region rich in both red and blue channels, wherein the region found is the salient region.

5. The method of claim 4, wherein the stain separation further comprises:
   calculating stain vectors based on the saliency analysis for the salient region.

6. The method of claim 2, identifying the nuclei further comprising:
   applying a window averaging procedure to each pixel to identify one or more blocks in the nuclei image;
   applying an inverse process on each pixel to obtain an inverse pixel and assigning the pixel value to the inverse pixel value;
   determining a pixel to be a nucleus center pixel if the pixel value is greater than a predetermined threshold; and
   excluding a pixel as a nucleus center pixel if the pixel value is equal or less than a predetermined threshold.

7. The method of claim 6 wherein the window averaging procedure is performed according to the equation:

$$\overline{P(i,j)} = \frac{1}{N \times N} \sum_{i=1}^{N} \sum_{j=1}^{N} P\left(i - \frac{N}{2}, j - \frac{N}{2}\right),$$

where N is a side length of a window over the nuclei image.

8. The method of claim 6 wherein identifying the nuclei further comprises:
   filtering the nuclei image using a low pass filter to generate a filtered nuclei image;
   applying a binary image generation process on each pixel of the filtered nuclei image to produce a binary image;
   applying a distance transform to the binary image to find the minimum distance between white and black pixels by generating a distance image with the minimum distance as a pixel value;

generating a new image where each pixel value is the sum of the value at the nucleus center pixel and distance image pixel; and identifying a nucleus center as a local maximum pixel in the new image.

9. The method of claim 3, removing non-important areas further comprising:

examining four neighboring areas of each identified nucleus to determine the existence of proximal nuclei; and excluding a current nucleus being examined if the amount of proximate nuclei is below a threshold.

10. The method of claim 3, removing non-important areas further comprising:

calculating average intensity of the nuclei image in four neighboring areas; and excluding a current nucleus when the intensity is lower than a threshold amount.

11. The method of claim 1, classifying further comprising:

performing a search across a plurality of directions to find a strongest membrane stain position each of the directions;

analyzing the strength of the membrane as one of intense, moderate or weak; and determining a class for the cell based on the membrane strength.

12. The method of claim 11, further comprising:

classifying the cell in class 3 when the membrane strength of at least 7 points are intense;

classifying the cell in class 2 when the membrane strength of 8 points are moderate or intense;

classifying the cell in class 1 when the membrane strength of at least 5 points is intense moderate or intense; and classifying the cell in class 0 in all other cases.

13. The method of claim 12 wherein the cancer diagnoses score is a human epidermal growth factor receptor 2 (HER2) score.

14. The method of claim 13 further comprising:

determining the final HER2 score to be 3+ when greater than 30% of cells are class 3 cells;

determining the final HER2 score to be 2+ when greater than 10% of cells are class 3 cells or class 2 cells;

determining the final HER2 score to be 1+ when greater than 10% of cells are class 3 cells, class 2 cells or class 1 cells; and determining the final HER2 score to be 0+ when less than 10% of cells are class 3 cells, class 2 cells or class 1 cells.

15. The method of claim 11 further comprising:

identifying cells with empty nucleus by identifying cell centers by:

calculating average membrane stain strength for a first square window surrounding each pixel in the in the slide image;

calculating average membrane stain strength for a second square window surrounding each pixel in the slide image, smaller in size than the first square window; and identifying a current pixel as a cell center when the average membrane stain strength of the first square window is less than the strength of the second square window.

16. An apparatus for determining a cancer diagnosis score comprising:

a nucleus identification module for identifying one or more nuclei in a slide image of a tissue sample, wherein the nucleus identification comprises:

a blob identification module for applying a window averaging procedure to each pixel to identify one or more blocks in the one or more nuclei in the slide image; and a transform module for applying an inverse process on each pixel to obtain an inverse pixel value;

a classification module for: determining one or more membrane strengths in the slide image surrounding each of the one or more nuclei; and classifying one or more cells, each corresponding to the one or more nuclei, in a class among a plurality of classes according to the one or more membrane strengths; and a scoring module for determining a cancer diagnosis score based on a percentage of cells classified in each of the plurality of classes.

17. The apparatus of claim 16, further comprising:

a region module for selecting a salient region of the slide image and performing stain separation in the salient region to obtain a nuclei image and a membrane image, wherein identifying the one or more nuclei is performed on the nuclei image and determining the one or more membrane strengths is performed on the membrane image.

18. The apparatus of claim 17, wherein the transform module further assigns the pixel value to the inverse pixel value, determines a pixel to be a nucleus center if the pixel value is greater than a predetermined threshold and excludes a pixel as a nucleus center if the pixel value is equal or less than a predetermined threshold.

19. The apparatus of claim 16, the classification module further comprising:

a membrane analysis module for classifying the cell in class 3 when the membrane strength of at least 7 points are intense, classifying the cell in class 2 when the membrane strength of 8 points are moderate or intense, classifying the cell in class 1 when the membrane strength of at least 5 points is intense moderate or intense and classifying the cell in class 0 in all other cases.

20. The apparatus of claim 19 wherein the scoring module further:

determines the final HER2 score to be 3+ when greater than 30% of cells are class 3 cells;

determines the final HER2 score to be 2+ when greater than 10% of cells are class 3 cells or class 2 cells;

determines the final HER2 score to be 1+ when greater than 10% of cells are class 3 cells, class 2 cells or class 1 cells; and determines the final HER2 score to be 0+ when less than 10% of cells are class 3 cells, class 2 cells or class 1 cells.

* * * * *